Figure 1:
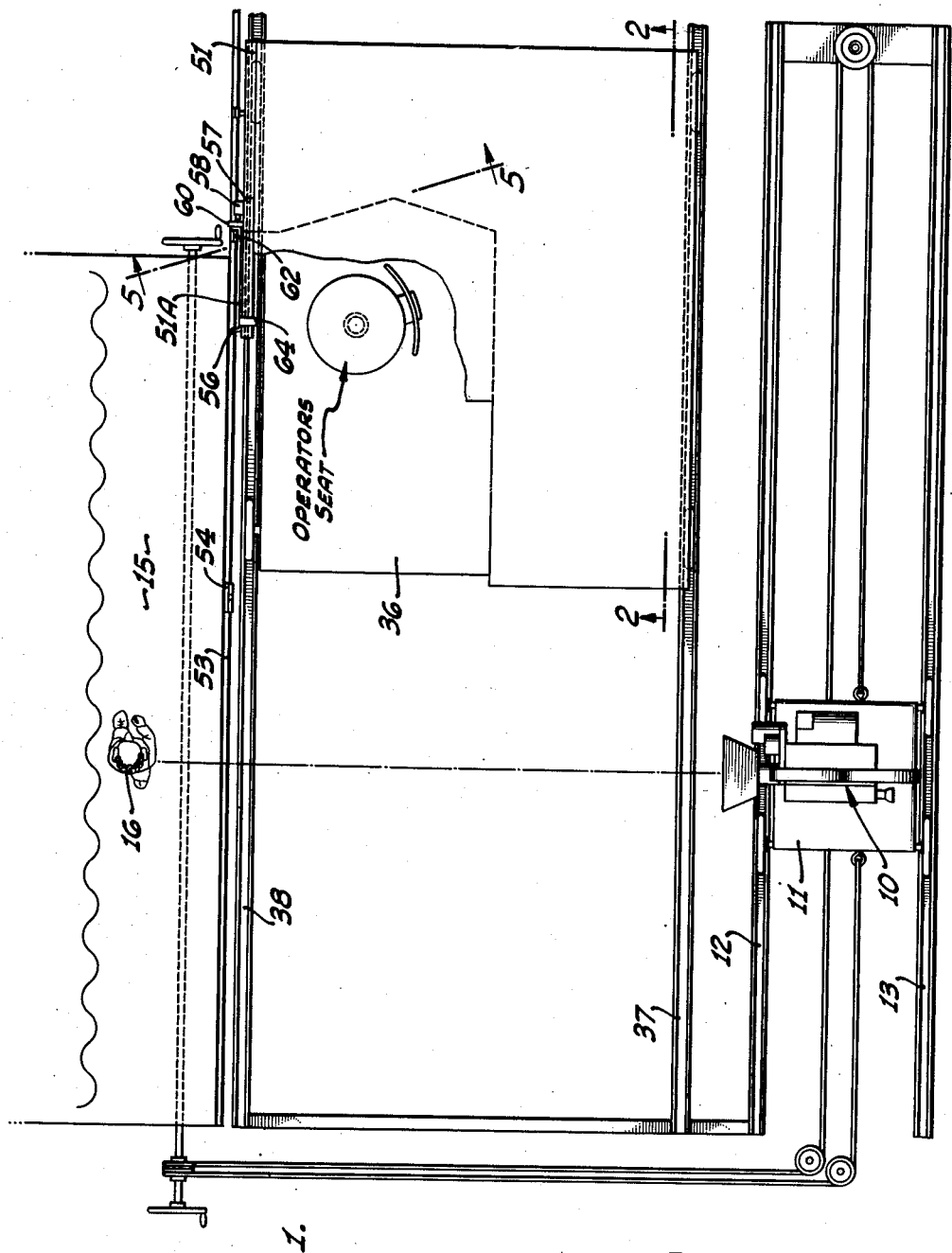

EDWIN GILLETTE, INVENTOR.

June 10, 1952 E. GILLETTE 2,599,624
MEANS FOR PRODUCING ANIMATED PICTURES
Filed Oct. 20, 1950 4 Sheets-Sheet 3
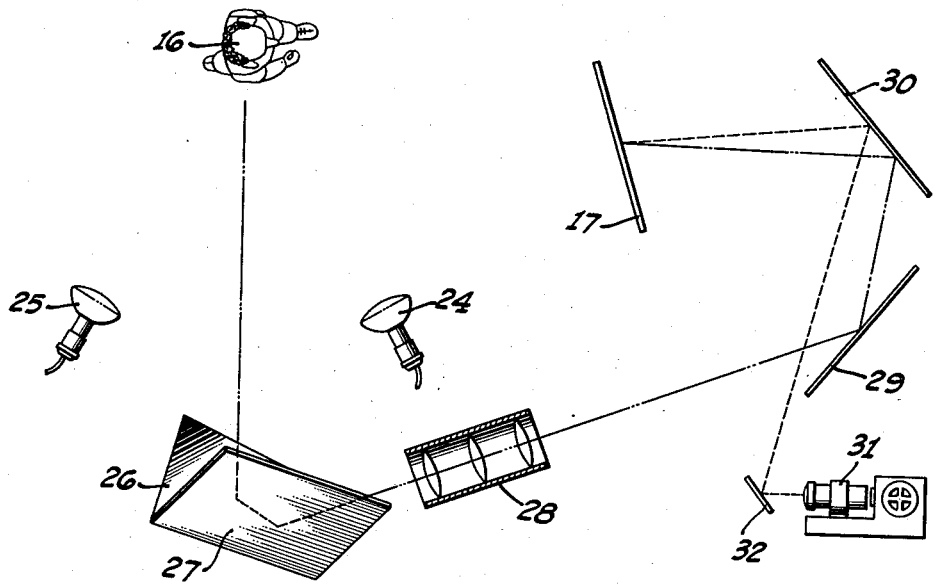
FIG. 3.
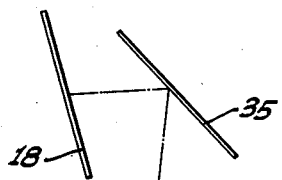
FIG. 4.
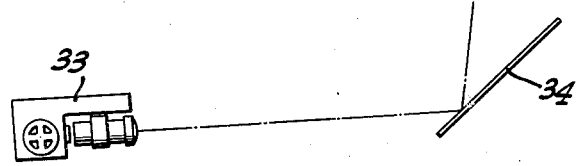
EDWIN GILLETTE,
INVENTOR.
BY
ATTORNEYS.

June 10, 1952  E. GILLETTE  2,599,624
MEANS FOR PRODUCING ANIMATED PICTURES
Filed Oct. 20, 1950  4 Sheets-Sheet 4

EDWIN GILLETTE,
INVENTOR.

BY *Lyon & Lyon*
ATTORNEYS.

Patented June 10, 1952

2,599,624

UNITED STATES PATENT OFFICE 2,599,624

MEANS FOR PRODUCING ANIMATED PICTURES

Edwin Gillette, Los Angeles, Calif.

Application October 20, 1950, Serial No. 191,223

2 Claims. (Cl. 88—16)

The present invention relates to the art of producing animated motion pictures using puppets.

The present invention contemplates generally the use of improved techniques in the following procedure of producing an animated picture of puppets simulating the movements of initially photographed live talent. In this general method, the first step consists in making a motion picture of the live talent who may be, for example, a baseball pitcher going through his pitching motions, against a background grid structure. This picture is projected in a second step onto a ground glass screen, only one frame of the baseball pitcher being projected during an interval so that the observer sees a still picture of the baseball pitcher on the screen in, of course, a correlated position with respect to the grid. The third step consists essentially in taking still pictures of the puppet on succeeding motion picture frames with the puppet adjusted to positions corresponding to the positions of the baseball pitcher. In order to aid in correctly adjusting the puppet, its image, by optical means, is projected onto a second ground glass screen which also has a similar grid simultaneously projected thereon.

An important feature of the present invention relates to the use of these two aforementioned grids, i. e., the one associated with the live talent and the one associated with the image of the puppet, to correlate the position of the live talent and the adjusted position of the puppet. Once the puppet is adjusted with reference to the grid, its picture is taken on one frame of the movie film. Then the live talent film, i. e., baseball pitcher film, is advanced one frame, the puppet is manually adjusted with reference to the grid and the puppet's picture is taken on a succeeding film frame.

It is therefore an object of the present invention to provide an improved system of this character functioning as indicated hereinabove and described in somewhat greater detail hereinafter.

A specific object of the present invention is to provide an improved system of this character in which two screens are used, one screen having projected thereon the image of the live talent with its associated grid structure, and the other screen having projected thereon the image of the puppet as well as an associated grid structure to aid in correlating the position of the puppet with respect to the position of the live talent.

Another specific object of the present invention is to provide an improved system of this character which allows the photographer of the puppet to show or indicate by pencil marks on the screen the "movement" of the puppet in the process of photographing the puppet in its various adjusted positions, so that there is less chance for a loss in continuity in the puppet's "movements."

Figure 2:
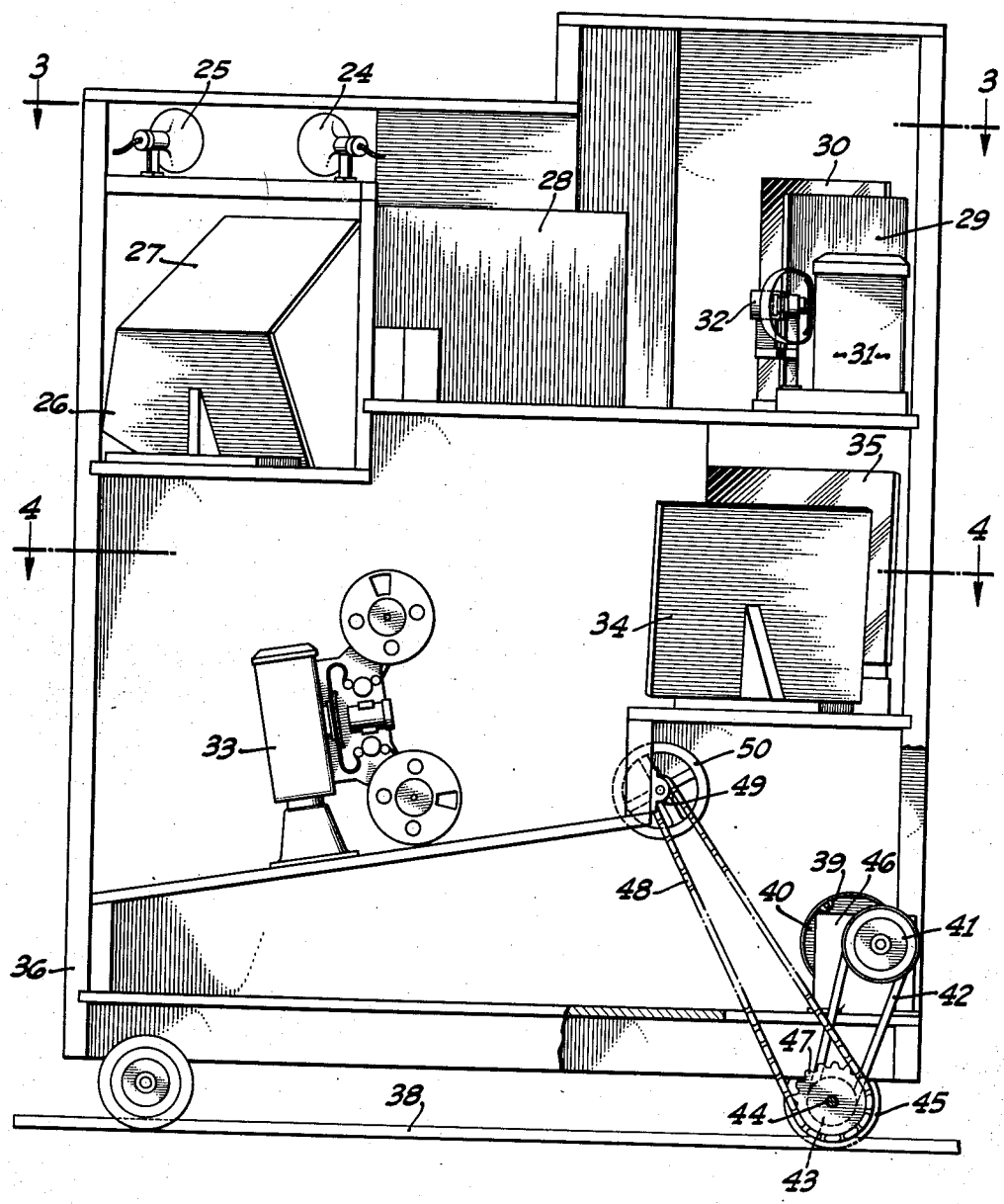
Figure 5:
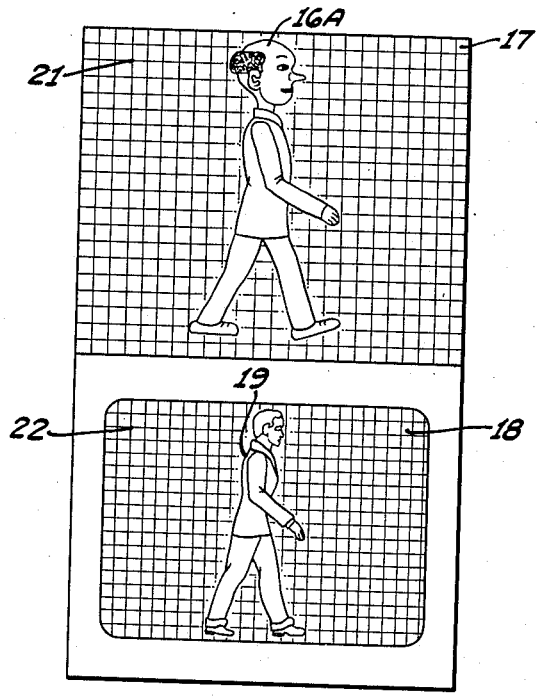
Figure 6:
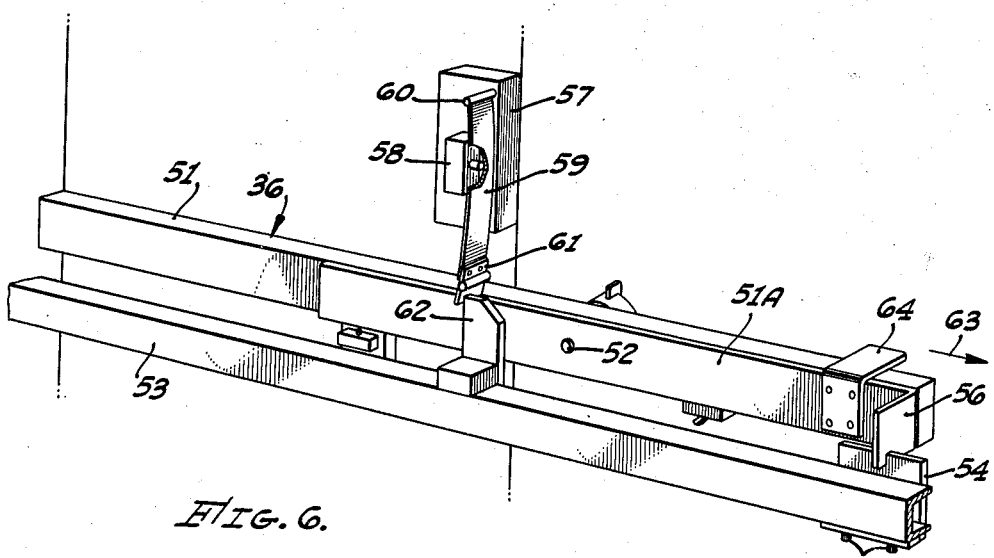

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a top plan view of apparatus useful in practicing the present invention, with a portion of the apparatus broken away to indicate internal structural details, Figure 2 is a view taken generally on the line 2—2 of Figure 1, Figures 3 and 4 are views taken generally on the lines 3—3 and 4—4 of Figure 2, Figure 5 is a view in elevation of projected images of the puppet and live talent together with their associated grid structures for producing important new results in accordance with the present invention, the images appearing on different ground glass screens seen when looking in the general direction indicated by the arrows 5—5 in Figure 1, and Figure 6 is a perspective view showing in greater detail a portion of the apparatus shown in Figure 1.

The apparatus shown herein includes a motion picture camera 10 with conventional means associated therewith whereby only a single frame of the film in the camera 10 may be exposed at a time. In other words, repeated movement of a control member (not shown) is necessary to expose successive film frames. The means whereby this may be accomplished is conventional, and since it, per se, forms no part of the present invention it is deemed unnecessary to describe the same in detail.

For purposes of reference, the camera 10 is therefore designated as a single frame motion picture camera.

The camera 10 may be mounted on a carriage 11 traveling in spaced tracks 12, 13, which extend generally parallel with the front edge of the stage 15 upon which the puppet 16 is adjustably positioned and held, as for example, by magnetic means, strings or the like. Thus, the camera 10 may be moved to take a picture of the puppet 16 on any part of the stage 15 upon which it may be placed.

Generally, the puppet has articulated arms, hands and legs, and is adjusted in a certain predetermined position, a frame of the film in camera 10 is then exposed, the puppet is adjusted to another predetermined position and a succeeding picture frame on the film in camera 10 is exposed. This procedure is continuous so that ultimately a film, exposed frame by frame, in accordance with different adjusted positions of the puppet, constitutes a composite motion picture for purposes of portraying the "movements" of the puppet through its various adjusted positions.

In accordance with an important feature of the present invention, there are novel means provided which aid the photographer in correctly adjusting the position of the puppet 16 in relationship to a projected image of originally photographed live talent.

In this respect, briefly, the image 16A (Figure 5) of the puppet 16 appears on a ground glass screen 17 disposed adjacent to a ground glass screen 18 upon which is simultaneously projected an image 19 of the initially photographed live talent. Simultaneously, with the projection of the images 16A and 19, images of grid structures 21, 22 are projected for purposes of aiding the photographer to correctly correlate the adjusted position of the puppet with respect to the image 19 of the live talent.

The optical system whereby the images 16A, 19 and associated grid structures 21, 22 are projected onto the ground glass screens 17, 18 is now described immediately below.

Referring to Figure 3, an image of the puppet 16 illuminated by light sources 24, 25 is projected onto the ground glass screen 17, after the light reflected from the puppet 16 is transferred through the following path: mirrors 26, 27, lens system 28, mirrors 29 and 30. The previously mentioned grid structure 21 is projected also onto the screen 17 using an auxiliary still picture projector 31, the light beam from which is transferred to the back of the ground glass screen 17 after reflection from the mirrors 32 and 30. The projector 31 may be a slide projector, and the slide or slide film inserted therein has a picture of the grid 21 which consists of, as shown in Figure 5, a series of equally spaced vertical lines intersected by a plurality of equally spaced horizontally extending lines. A plurality of slides may be used for projecting grids in which the vertical and horizontal coordinate lines of each slide are equally spaced, but with different frames of the slides having the coordinate lines forming the grids spaced closer together or further apart, to obtain a more "open" or "closed" projected mesh.

By thus providing a choice of grids, the height of both puppet and live talent images may be represented by the same number of grid squares. For example, in Figure 5, the height of the live talent image is represented by a height of 17 grid squares, and the grid projected on the same screen 17 as the image of the puppet is so chosen that the height of the puppet image is likewise represented by 17 grid squares, regardless of the actual size of the puppet image itself.

Instead of using one of a series of slides for this purpose, the different grids may be included on succeeding frames of an extended closed loop of motion picture film, if desired. It is desirable to allow a selection of different sized grids 21 whereby the photographer may choose one which has "openings" which correspond with the "openings" in the grid 22.

On the other hand, the image 19 (Figure 5) of the live talent is projected onto the back of the ground glass screen 18 in the manner shown in Figure 4. In Figure 4 the projected beam from the live action projector 33 is reflected first by the mirror 34 and by the mirror 35 onto the back of the ground glass screen 18. The projector 33 serves to project a single frame of a motion picture film, such motion picture film including pictures of the live talent going through predetermined motions while standing in front of a grid background.

Thus, the motion picture film projected by the projector 33 includes both the live talent as well as the grid structure, and these are, of course, simultaneously projected onto the back of the ground glass screen 18.

The different mirrors, lenses and projectors and associated ground glass screens 17, 18, shown in Figures 2, 3, 4 and 5, are all mounted on a wheel carriage 36, which is moveable in a pair of parallel spaced tracks 37, 38. It is observed that tracks 37, 38 extend generally parallel with the front edge of the stage 15 and are spaced in front of the same.

The carriage 36 is provided to allow more convenient access to the stage and puppet, and more particularly so that the apparatus mounted on the carriage may be moved to one side of the line of sight of the camera 10 during each successive exposure, it being returned to a predetermined position thereafter for purposes of positioning the puppet for the next exposure. The carriage is preferably provided with a motor drive and associated means whereby the carriage 36 is always positioned in the same position when making a comparison between the puppet 16A and image 19 in relationship to the grid structures 21, 22. For this purpose an electric driving motor 40 is mounted on the carriage 36 with its output shaft coupled through gear box 46, for purposes of speed reduction, to the pulley 41. A V-belt 42 passes over the pulley 41 as well as a driven pulley 43 mounted on the shaft 44 to which is keyed the carriage drive wheels 45. Also, the wheel 45 has mounted thereon a sprocket 47 over which an endless chain 48 passes. This endless chain 48 passes likewise over a sprocket wheel 49 mounted on the rotatable hand wheel 50. It is observed that both the motor 39 and wheel 50 are effective to rotate the wheel 45 to produce movement of the carriage 36. The motor 39 is used as a "coarse" drive and the hand wheel 50 is used as a "fine" or vernier adjustment.

The motor 39 is automatically deenergized when the carriage 36 is driven thereby to a predetermined position, using the means shown in detail in Figure 6. The carriage 36 has mounted thereon a carriage bar 51 which carries a locking bar 51A mounted for pivotal movement about the pivot pin 52. This pivoted bar 51A extends generally parallel with the relatively stationary bar 53 affixed to the puppet stage. This bar 53 mounts the notched plate 54 which is adjustably held thereon by means of thumb screws 55, such screws 55 serving to clamp the notched plate 54 to the bar 53. It is noted that the free end of the bar 51A carries a transversely extending plate 56 adapted to enter the notched portion of plate 54, as shown in Figure 6, when the carriage 36 is correctly positioned with respect to the puppet stage, i. e., when the bar 51A is correctly positioned with the bar 53. The carriage 36 also mounts a support or bracket 57 for mounting a microswitch 58 and microswitch actuating lever 59, which is pivoted at its upper end about the pivot pin 60. The lower end of the lever 59 carries a conventional leaf type hinge 61, which cooperates with the adjustably positioned abutment 62 on the bar 53. This hinge 61 serves essentially as a one-way stop for checking movement of the microswitch 58 only when the carriage 36, i. e., bar 51 is moved towards the right as indicated by the arrow 63 in Figure 6.

The microswitch 58 is a normally open one and is connected so as to cause deenergization of the driving motor 39. Upon actuation of the switch 58, the motor 39 is deenergized. Assuming that the bar 51 is initially further to the left than shown in Figure 6 with respect to the stationary bar 53, and the motor 39 is energized, the bar 51 is moved in the direction indicated by the arrow 63 until the abutment 62 engages the one-way hinge 61, to cause actuation of switch 58, whereupon the motor 39 is deenergized and thereafter the carriage 36 is moved more slowly and manually by the operator upon turning the hand wheel 50 shown in Figure 2. The hand wheel 50 is turned until the transversely extending plate 56 (Figure 6) is aligned with the notch in the plate 54. When this condition is obtained, the hand wheel 50 is no longer turned and the operator, using the handle 64 on the bar 51, inserts the plate 56 into the notch in plate 54 to thereby lock the carriage to the stage in a predetermined position.

In operation of the system, projector 33 projects a single frame of the live talent onto the ground glass screen 18. The image appearing thereon includes the image 19 of the live talent as well as the grid 22. The grid projector 31 (Figures 3 and 2) is adjusted so that a grid 21 appears on the ground glass screen 17 to obtain the relationship set forth above, i. e., the heights of the images of both the live talent and the puppet are represented by the same number of grid squares. The grids 21, 22 are then used for reference purposes in effecting an adjustment of the puppet 16 on the puppet stage. The articulated arms, legs and head of the puppet are adjusted so that the puppet image 16A occupies substantially the same position with respect to the grid 21, as does the image 19 with respect to the grid 22. Once the puppet is thus adjusted, the locking bar 51A is disengaged from the notched plate 54, the driving motor is energized to move the carriage out of the field of the lens on camera 10. Then a single frame of the motion picture type film in camera 10 is exposed. Thereafter, the carriage is brought back into its previous position and the next frame on the film in the live talent projector 33 is projected onto the screen 18. The puppet 16 is readjusted to assume a corresponding position with respect to the grid 21 as the new image 19 does in relationship to its grid 22. Once this adjustment is again obtained, the carriage is again moved out of the field of the camera 10 and the next succeeding frame in the film in camera 10 is exposed. This process thus continues in these steps. In the process of photographing the puppet in its various adjusted positions, the photographer, if he desires, may sketch on the ground glass screen 17 the "path" taken by the puppet to assure himself that the puppet's "movements" are continuous, and to also aid him in making the proper adjustment or readjustment of the puppet should the puppet inadvertently get out of position.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In apparatus of the character described, a puppet stage, a camera, a carriage supporting said camera and being movable in a guided path with respect to said stage, puppet orienting equipment comprising a carriage movably mounted in a guided path with respect to said stage and between said stage and said camera, a first projection screen, projecting means for projecting an image of live talent and a grid onto said first screen, a second projection screen, means for projecting a grid corresponding to the first mentioned screen onto said second grid, and means for projecting an image of said puppet onto said second screen, superimposed on the grid projected thereon.

2. In an arrangement of the character described, a puppet stage, a camera mounted for movement in front of said stage, apparatus for aiding in correctly positioning a puppet on said stage, said apparatus comprising: a first screen, means for projecting an image of live talent superimposed on a first grid on said first screen, said first grid comprising a plurality of equally spaced horizontal and vertical lines, a second projection screen mounted adjacent said first screen, means for projecting a grid onto said second screen which is substantially identical with the first mentioned grid, and means for projecting an image of a puppet on said stage onto said second screen and superimposed on said second grid.

EDWIN GILLETTE.

REFERENCES CITED

The following references are of record in the file of this patent:

UNITED STATES PATENTS

| Number | Name | Date |
|---|---|---|
| 1,275,496 | Taylor et al. | Aug. 13, 1918 |
| 1,379,905 | Down | May 31, 1921 |
| 2,198,006 | Garity | Apr. 23, 1940 |
| 2,241,929 | Kendig | May 13, 1941 |
| 2,281,033 | Garity | Apr. 28, 1942 |
| 2,310,254 | Nassour | Feb. 9, 1943 |
| 2,317,550 | Ormond | Apr. 27, 1943 |
| 2,327,059 | Pal | Aug. 17, 1943 |
| 2,358,530 | Nassour | Sept. 19, 1944 |
| 2,494,000 | Robertson | Jan. 10, 1950 |